United States Patent
Stephens et al.

(10) Patent No.: US 6,759,454 B2
(45) Date of Patent: Jul. 6, 2004

(54) POLYMER MODIFIED BITUMEN COMPOSITIONS

(75) Inventors: Keith E. Stephens, Houston, TX (US); Robert Q. Kluttz, Houston, TX (US); Dale L. Handlin, Jr., Houston, TX (US); Carl L. Willis, Houston, TX (US)

(73) Assignee: KRATON Polymers U.S. LLC, Houston, TX (US)

( * ) Notice: Subject to any disclaimer, the term of this patent is extended or adjusted under 35 U.S.C. 154(b) by 0 days.

(21) Appl. No.: 10/359,906

(22) Filed: Feb. 6, 2003

(65) Prior Publication Data

US 2003/0149140 A1 Aug. 7, 2003

Related U.S. Application Data

(60) Provisional application No. 60/355,210, filed on Feb. 7, 2002.

(51) Int. Cl.$^7$ ............................................. C08L 95/00
(52) U.S. Cl. ................................. 524/68; 524/59
(58) Field of Search ..................... 524/68, 59

(56) References Cited

U.S. PATENT DOCUMENTS

| | | |
|---|---|---|
| 2,975,160 A | 3/1961 | Zelinski |
| 3,149,182 A | 9/1964 | Porter |
| RE27,145 E | 6/1971 | Jones |
| 3,595,942 A | 7/1971 | Wald et al. |
| 3,600,250 A | 8/1971 | Evans |
| 3,634,549 A | 1/1972 | Shaw et al. |
| 3,670,054 A | 6/1972 | De La Mare et al. |
| 3,700,633 A | 10/1972 | Wald et al. |
| 4,073,831 A | 2/1978 | Tabana et al. |
| 4,089,913 A | 5/1978 | Miki et al. |
| 4,107,131 A | 8/1978 | Gergen et al. |
| 4,129,541 A | 12/1978 | Marrs et al. |
| 4,145,322 A | 3/1979 | Maldonado et al. |
| 4,367,325 A | 1/1983 | Takeuchi et al. |
| 4,412,087 A | 10/1983 | Trepka |
| 4,530,652 A | 7/1985 | Buck et al. |
| 4,547,560 A | 10/1985 | Hattori et al. |
| 4,578,429 A | 3/1986 | Gergen et al. |
| 4,603,155 A | 7/1986 | Muramori et al. |
| 4,898,914 A | 2/1990 | Gergen et al. |
| 4,970,265 A | 11/1990 | Willis |
| 5,075,377 A | 12/1991 | Kawabuchi et al. |
| 5,191,024 A | 3/1993 | Shibata et al. |
| 5,206,300 A | 4/1993 | Chamberlain |
| 5,276,101 A | 1/1994 | Chamberlain et al. |
| 5,290,875 A | 3/1994 | Moczygemba et al. |
| 5,306,779 A | 4/1994 | Shibata et al. |
| 5,331,028 A | 7/1994 | Goodrich |
| 5,346,964 A | 9/1994 | Shibata et al. |
| 5,451,619 A | 9/1995 | Kluttz et al. |
| 5,506,299 A | 4/1996 | Gelles et al. |
| 5,516,831 A | 5/1996 | Pottick et al. |
| 5,545,690 A | 8/1996 | Trepka et al. |
| 5,603,155 A | 2/1997 | Satomi et al. |
| 5,773,496 A | 6/1998 | Grubba |
| 5,776,234 A | 7/1998 | Schilling |
| 5,854,335 A | 12/1998 | Heimerikx et al. |
| 5,910,546 A | 6/1999 | Trepka et al. |
| 5,973,037 A | 10/1999 | Fields |
| 5,998,514 A | 12/1999 | Cheng et al. |
| 6,031,053 A | 2/2000 | Knoll et al. |
| 6,100,317 A | 8/2000 | Liang et al. |
| 6,107,411 A | 8/2000 | Toya et al. |
| 6,143,808 A | 11/2000 | Sack et al. |
| 6,197,889 B1 | 3/2001 | Knoll et al. |
| 6,265,484 B1 | 7/2001 | Trepka et al. |
| 6,265,485 B1 | 7/2001 | Trepka et al. |
| 6,310,122 B1 | 10/2001 | Butler et al. |
| RE37,581 E | 3/2002 | Haveaux et al. |
| 6,429,241 B1 | 8/2002 | Liang |

FOREIGN PATENT DOCUMENTS

| | | |
|---|---|---|
| EP | 0 492 490 B1 | 8/1996 |
| EP | 0 877 038 A2 | 11/1998 |
| EP | 0 654 488 B1 | 1/1999 |
| EP | 0 398 758 B1 | 3/1999 |
| EP | 0 859 803 B1 | 12/1999 |
| EP | 0 927 210 B1 | 6/2000 |
| EP | 0 766 706 B1 | 12/2001 |
| GB | 2 138 009 A | 10/1984 |
| JP | 61-291610 | 12/1986 |
| JP | 6-271717 | 9/1994 |
| JP | 7-149952 | 6/1995 |
| WO | 00/58380 | 10/2000 |

*Primary Examiner*—Peter Szekely
(74) *Attorney, Agent, or Firm*—Michael A. Masse

(57) ABSTRACT

The present invention is a polymer modified bituminous composition having improved phase stability, heat aging and viscosity characteristics. The bituminous compositions are blends comprising bitumen and from about 0.5 to about 25% of a novel anionic block copolymer where one of the blocks is a controlled distribution copolymer of a conjugated diene and a mono-alkenyl arene having a specific arrangement of the monomers in the copolymer block. The composition of the invention is useful for paving, roofing felts, water-proof membrane, adhesive, mopping asphalt, carpet backing and pipe coating applications.

29 Claims, No Drawings

POLYMER MODIFIED BITUMEN COMPOSITIONS

CROSS REFERENCE TO RELATED APPLICATIONS

The present application claims priority from U.S. Provisional Patent Application Serial No. 60/335,210, filed Feb. 7, 2002, entitled Novel Block Copolymers and Method for Making Same.

The present application is related to copending, commonly assigned U.S. patent application Ser. No. 10/359,981 entitled Novel Block Copolymers and Method for Making Same, now published as US2003/0176582 A1, copending, commonly assigned U.S. patent application Ser. No. 10/359,907 entitled Articles Prepared From Hydrogenated Controlled Distribution Block Copolymers, now published as US2003/0181585 A1, copending, commonly assigned U.S. patent application Ser. No. 10/359,927 entitled Adhesives and Sealants From Controlled Distribution Block Copolymers, now published as US2003/0176574 A1, copending, commonly assigned U.S. patent application Ser. No. 10/359,953 entitled Articles Prepared From Controlled Distribution Block Copolymers, now published as US2003/0166776 A1, copending, commonly assigned U.S. patent application Ser. No. 10/359,462 entitled Gels From Controlled Distribution Block Copolymers, now published as US2003/0153681 A1, all of which were filed Feb. 6, 2003 and copending, commonly assigned International Patent Application Serial Number PCT/NL03/00098 filed on Feb. 7, 2003 entitled Solvent-Free, Hot Melt Adhesive Composition Comprising a Controlled Distribution Block Copolymer, now published as WO 03/066769 A1, and copending, commonly assigned U.S. patent application Ser. No. 10/209,285 filed Jul. 31, 2002 entitled Elastomeric Articles Prepared From Controlled Distribution Block Copolymers, now published as US2003/0181584 A1, all of which claim priority from U.S. Provisional Patent Application Serial No. 60/355,210 filed Feb. 7, 2002.

FIELD OF THE INVENTION

The present invention relates to polymer modified bituminous compositions having improved phase stability, heat aging and viscosity characteristics. In particular, the invention relates to compositions containing a novel anionic block copolymer where one of the blocks is a controlled distribution copolymer of a conjugated diene and a mono-alkenyl arene having a specific arrangement of the monomers in the copolymer block.

BACKGROUND OF THE INVENTION

Naturally occurring or petroleum derived bitumen is a useful material for many applications. However, bitumen by itself often cannot meet the performance requirements for applications such as paving, roofing felts and water-proofing membranes. Therefore, approaches have been developed whereby polymers are added to the bitumen to increase properties such as low temperature flexibility and high temperature softening point. Improvements in either the low temperature or high temperature properties result in an increased temperature range of practical use. In some polymer-modified bitumen compositions the polymer is especially effective and these property increases occur simultaneously. In addition to improvements in temperature range of use, improvements in fatigue resistance, thermal cracking and rutting resistance can be achieved.

Of particular utility in the field of polymer-modified bituminous compositions are anionic vinyl aromatic—conjugated diene block copolymers. U.S. Pat. No. 4,129,541 teaches the use of radial styrene—butadiene block copolymers to improve the low temperature flexibility and stress crack resistance of bitumen for cold temperature coating applications.

The limited compatibility, however, of polymers with bitumen components often leads to unstable blends and thereby results in variable and/or inferior properties.

A variety of approaches have been taken to improve the compatibility of anionic block copolymers with bitumen. The technology disclosed in U.S. Pat. No. 4,145,322 teaches the use of sulfur crosslinking agents in conjunction with anionic block copolymers. The crosslinked compositions exhibit excellent high and low temperature characteristics. Importantly, the addition of anionic triblock copolymers changed the inherent character of bitumen from viscous to visco-elastic.

Further improvements in the sulfur crosslinking approach were taught in U.S. Pat. No. 5,773,496 wherein combinations of anionic block and radial, or multi-armed, copolymers were used in blends with bitumen. Because of the relatively high amounts of diblock copolymer, crosslinking by sulfur was necessary to attain property improvements, particularly improvements in force ductility. In U.S. Pat. No. 6,429,241 approaches to improved properties were taught whereby a relatively high amount of sulfur crosslinking of an anionic triblock copolymer/bitumen blend was achieved by a process utilizing incremental addition of the copolymer and crosslinker.

While leading to property improvements, the approach of crosslinking to stabilize anionic block copolymer/bitumen blends has the drawback of requiring extra materials (i.e., the crosslinking agents) and extra process steps for incorporating these agents. This process has the further drawback of resulting in either weak products or highly gelled products when the crosslinking agent is improperly used. Further undesirable features of sulfur crosslinking is the generation of hydrogen sulfide during processing which presents environmental and health risks.

Another approach to improved property sets through the formation of stable polymer-modified bituminous compositions is by the use of compatibilizers. U.S. Pat. No. 5,331,028 teaches the use of a glycidated ethylene copolymer as a compatibilizer for SBS/bitumen blends. In this technology, the functionalized ethylene copolymer is reacted with the bitumen to form a bituminous component more receptive to anionic block copolymer blending.

Other functionalized polymers useful as block copolymer—bitumen compatibilizers such as epoxidized polydienes have been taught in U.S. Pat. No. 5,451,619 and polar polymers such as functionalized polyethylene in U.S. Pat. No. 6,100,317.

Incorporation of compatibilizing polymers to stabilize anionic block copolymer—bitumen blends has led to significant property improvements. However, this approach requires the addition of a third component which is often expensive. Further, the processes for preparation of the blends can be generally complex because of steps required to produce the compatibilizer or those required for blending into the bitumen composition.

Simpler approaches whereby the anionic block copolymer composition or structure is modified during its initial manufacture are attractive from a process and cost point of view. U.S. Pat. No. 4,530,652 and U.S. Pat. No. 5,854,335 teach the modification of the butadiene rubber block of anionic block copolymers to achieve enchanced compatibility and performance. In particular, the rubber midblock is modified to increase the 1,2-addition of the butadiene during polymerization. The increased compatibility achieved by this approach results in improved retention of properties after heat aging, increased flexibility and improved high temperature flow resistance.

It has now been found that anionic block copolymers having a controlled distribution rubber block comprising alkenyl arene and conjugated diene monomer units have excellent compatability with bitumen. Such block copolymers and methods for making them are described in above referenced U.S. Provisional Patent Application Serial No. 60/355,210 and in copending, commonly owned U.S. patent application Ser. No. 10/359,981, now published as US2003/0176582 A1. Further, the performance characteristics of such compositions are attractive for a variety of applications such as paving, roofing felts, water-proofing membranes, asphaltic adhesives, mopping asphalts, carpet backings, sound-deadening and coatings.

SUMMARY OF THE INVENTION

The present invention is a bituminous composition comprising:

I) from about 75 percent to about 99.5 percent bitumen; and

II) from about 0.5 percent to about 25 percent weight of a block copolymer having at least one A block and at least one B block wherein:
  a) each A block is a mono-alkenyl arene homopolymer block and each B block is a controlled distribution copolymer block of at least one conjugated diene and at least one mono-alkenyl arene;
  b) each A block having a number average molecular weight between about 3,000 and about 60,000 and each B block having a number average molecular weight between about 30,000 and about 300,000;
  c) each B block comprises terminal regions adjacent to the A blocks that are rich in conjugated diene units and one or more regions not adjacent to the A blocks that are rich in mono-alkenyl arene units;
  d) the total amount of mono-alkenyl arene in the block copolymer is about 20 percent weight to about 80 percent weight; and
  e) the weight percent of mono-alkenyl arene in each B block is between about 10 percent and about 75 percent.

The block copolymer of the present invention may be unsaturated or selectively, partially or fully saturated by hydrogenation. The advantages of the present invention are bituminous compositions of increased compatibility having improved heat aging characteristics and broad service temperatures. Specific applications of this composition are paving formulations, roofing felts, water-proofing membranes, asphaltic adhesives, mopping asphalts, pipe coatings and carpet backings.

DETAILED DESCRIPTION OF THE INVENTION

The present invention offers bituminous compositions comprising novel anionic block copolymers. The novel anionic block copolymers result from the copolymerization of alkenyl arenes and dienes as part of a mono alkenyl arene/conjugated diene block copolymer. Surprisingly, the combination of (1) a unique control for the monomer addition and (2) the use of diethyl ether or other modifiers as a component of the solvent (which will be referred to as "distribution agents") results in a certain characteristic distribution of the two monomers (herein termed a "controlled distribution" polymerization, i.e., a polymerization resulting in a "controlled distribution" structure), and also results in the presence of certain mono alkenyl arene rich regions and certain conjugated diene rich regions in the polymer block. For purposes hereof, "controlled distribution" is defined as referring to a molecular structure having the following attributes: (1) terminal regions adjacent to the mono alkenyl arene homopolymer ("A") blocks that are rich in conjugated diene units; (2) one or more regions not adjacent to the A blocks that are rich in mono alkenyl arene units; and (3) an overall structure having relatively low blockiness. For the purposes hereof, "rich in" means greater than the average amount, preferably greater than 5% of the average amount. The relatively low blockiness of the controlled distribution ("B") blocks can be shown by either the presence of only a single ("Tg") intermediate between the Tg's of either monomer alone, when analyzed using differential scanning calorimetry ("DSC") (thermal) methods or via mechanical methods, or as shown via proton nuclear magnetic resonance ("H1-NMR") methods. The potential for blockiness can also be inferred from measurement of the UV-visible absorbance in a wavelength range suitable for the detection of polystyryllithium end groups during the polymerization of the B block. A sharp and substantial increase in this value is indicative of a substantial increase in polystyryllithium chain ends. In this process, this will only occur if the conjugated diene concentration drops below the critical level necessary to maintain controlled distribution polymerization. Any styrene monomer that is present at this point will add in a blocky fashion. The term "styrene blockiness", as measured by those skilled in the art using proton NMR, is defined to be the proportion of S units in the polymer having two S nearest neighbors on the polymer chain. The styrene blockiness is determined after using H1-NMR to measure two experimental quantities as follows:

First, the total number of styrene units (i.e. arbitrary instrument units which cancel out when ratioed) is determined by integrating the total styrene aromatic signal in the H1-NMR spectrum from 7.5 to 6.2 ppm and dividing this quantity by 5 to account for the 5 aromatic hydrogens on each styrene aromatic ring.

Second, the blocky styrene units are determined by integrating that portion of the aromatic signal in the H1-NMR spectrum from the signal minimum between 6.88 and 6.80 to 6.2 ppm and dividing this quantity by 2 to account for the 2 ortho hydrogens on each blocky styrene aromatic ring. The assignment of this signal to the two ortho hydrogens on the rings of those styrene units which have two styrene nearest neighbors was reported in F. A. Bovey, *High Resolution NMR of Macromolecules* (Academic Press, New York and London, 1972), chapter 6.

The styrene blockiness is simply the percentage of blocky styrene to total styrene units:

Blocky %=100 times (Blocky Styrene Units/Total Styrene Units)

Expressed thus, Polymer-Bd-S—(S)n-S-Bd-Polymer. where n is greater than zero is defined to be blocky styrene. For example, if n equals 8 in the example above, then the blockiness index would be 80%. It is preferred that the blockiness index be less than about 42. For some polymers, having styrene contents of 10 weight percent to about 50 weight percent, it is preferred that the blockiness index be less than about 22.

As used herein, "thermoplastic block copolymer" is defined as a block copolymer having at least a first block of one or more mono alkenyl arenes (A block), such as styrene and a second block of a controlled distribution copolymer (B block) of diene and mono alkenyl arene. The method to prepare this thermoplastic block copolymer is via any of the methods generally known for block polymerizations. The present invention includes as an embodiment a thermoplastic copolymer composition, which may be either a di-block copolymer, tri-block copolymer, tetra-block copolymer or multi-block copolymer composition. In the case of the di-block copolymer composition, one block is the alkenyl arene-based homopolymer block and polymerized therewith is a second block of a controlled distribution copolymer of diene and alkenyl arene. In the case of the tri-block copolymer composition, it comprises, as end-blocks the glassy alkenyl arene-based homopolymer and as a mid-block the controlled distribution copolymer of diene and alkenyl arene. Where a tri-block copolymer composition is prepared, the controlled distribution diene/alkenyl arene copolymer can be herein designated as "B" and the alkenyl arene-based homopolymer designated as "A". The A—B—A, tri-block copolymer compositions can be made by either sequential polymerization or coupling. In the sequential solution polymerization technique, the mono alkenyl arene is first introduced to produce the relatively hard aromatic block, followed by introduction of the controlled distribution diene/alkenyl arene mixture to form the mid block, and then followed by introduction of the mono alkenyl arene to form the terminal block. In addition to the linear, A—B—A configuration, the blocks can be structured to form a radial (branched) polymer, $(A—B)_nX$ or $(A—B—A)_nX$, or both types of structures can be combined in a mixture. Some A—B diblock polymer can be present but preferably at least about 70 weight percent of the block copolymer is A—B—A or radial (or otherwise branched so as to have 2 or more terminal resinous blocks per molecule) so as to impart strength.

The controlled distribution structure is very important in managing the strength and Tg of the resulting thermoplastic elastomer. In the controlled distribution structure the styrene blockiness is low and this ensures that there is virtually no phase separation of the two monomers. This is in contrast to copolymers in which the monomers actually remain as separate "microphases", and thereby have separate and distinct Tg's. Because only one Tg is present in the controlled distribution copolymer, the thermal performance of the resulting copolymer is predictable and, in fact, predeterminable.

An important feature of the thermoplastic elastomeric di-block, tri-block, multi-block and radial block copolymers of the present invention, including one or more controlled distribution diene/alkenyl arene copolymer blocks (B block) and one or more mono alkenyl arene (A block), is the separate Tg's of the A and B blocks. The Tg of the alkenyl arene A blocks is higher than the Tg of the controlled distribution copolymer B blocks. The Tg of the controlled distribution block is preferably at least about −60 degrees C., more preferably from about −40 degrees C. to about +30 degrees C., and most preferably from about −40 degrees C. to about +10 degrees C. The higher Tg of the alkenyl arene A blocks is preferably from about +80 degrees C. to about +110 degrees C., more preferably from about +80 degrees C. to about +105 degrees C.

When such a controlled distribution structure is used as one block in a di-block, tri-block or multi-block copolymer, the relatively higher Tg made possible by means of the presence of an appropriately-constituted controlled distribution copolymer region will tend to improve flow and processability. In addition, it is possible that while the incorporation of mono-alkenyl arene in the conjugated diene rubber blocks leads to an elevated aromatic content of the anionic block, while a rubbery character of this block is maintained. This elevated aromatic content is particularly useful when making blends with highly aromatic materials such as bitumen. In this situation, the elevated aromatic content provides an enhanced compatibility of the blend thereby allowing new combinations and/or improved performance properties. Modification of certain other properties of the anionic block copolymer itself as well as of blends with other materials is also achievable.

In a preferred embodiment of the present invention, the subject controlled distribution copolymer block has two distinct types of regions: conjugated diene rich regions on the ends of the block; and, a mono alkenyl arene rich region near the middle or center of the block. What is desired is a mono alkenyl arene/conjugated diene controlled distribution copolymer block, wherein the proportion of mono alkenyl arene units increases gradually to a maximum near the middle or center of the block. This structure is distinct and different from the tapered and/or random structures discussed in the prior art.

As discussed above, the controlled distribution polymer block has diene rich region(s) adjacent to the A block and an arene rich region not adjacent to the A block, and typically near the center of the B block. Typically the region adjacent to the A block comprises the first 15 to 25% of the block and comprises the diene rich region(s), with the remainder considered to be arene rich. The term "diene rich" means that the region has a measurably higher ratio of diene to arene than the arene rich region. Another way to express this is the proportion of mono alkenyl arene units increases gradually along the polymer chain to a maximum near the middle or center of the block (if we are describing an ABA structure) and then decreases gradually until the polymer block is fully polymerized. For the controlled distribution block B, the weight percent of mono alkenyl arene is between about 10 percent and about 75.

Polymerization conditions used to prepare the novel copolymers of the present invention are typically similar to those used for anionic polymerizations in general. The specific polymerization procedures employed for the synthesis of the controlled distribution block is a process in which (1) the monomer addition is uniquely controlled and, (2) a distribution agent is employed. The controlled distribution block copolymers can be made using a two-reactor or a single reactor polymerization scheme. It will be appreciated by those skilled in the art that the exact polymerization conditions will depend upon which scheme is employed.

The alkenyl arene monomers of the controlled distribution block copolymer can be selected from styrene, alpha-methylstyrene, para-methylstyrene, vinyl toluene, vinylnaphthalene, and para-butyl styrene or mixtures thereof. Of these, styrene is most preferred and is commercially available, and relatively inexpensive, from a variety of manufacturers. The conjugated dienes for use herein are 1,3-butadiene and substituted butadienes such as isoprene, piperylene, 2,3-dimethyl-1,3-butadiene, and 1-phenyl-1,3-butadiene, or mixtures thereof. Of these, 1,3-butadiene is most preferred. As used herein, and in the claims, "butadiene" refers specifically to "1,3-butadiene".

For the controlled distribution or B block the weight percent of mono alkenyl arene in each B block is between about 10 weight percent and about 75 weight percent, preferably between about 25 weight percent and about 50 weight percent for selectively hydrogenated polymers.

It is also important to control the molecular weight of the various blocks. For an AB diblock, desired block weights are 3,000 to about 60,000 for the mono alkenyl arene A block, and 30,000 to about 300,000 for the controlled distribution conjugated diene/mono alkenyl arene B block. Preferred ranges are 5000 to 45,000 for the A block and 50,000 to about 250,000 for the B block. For the triblock, which may be a sequential ABA or coupled (AB)$_2$ X block copolymer, the A blocks should be 3,000 to about 60,000, preferably 5000 to about 45,000, while the B block for the sequential block should be about 30,000 to about 300,000, and the B blocks (two) for the coupled polymer half that amount. The total average molecular weight for the triblock copolymer should be from about 40,000 to about 400,000, and for the radial copolymer from about 60,000 to about 600,000. For the tetrablock copolymer ABAB the block size for the terminal B block should be about 2,000 to about 40,000, and the other blocks may be similar to that of the sequential triblock copolymer. These molecular weights are most accurately determined by light scattering measurements.

An important aspect of the present invention is to control the microstructure or vinyl content of the conjugated diene in the controlled distribution copolymer block. The term "vinyl content" refers to the fact that a conjugated diene is polymerized via 1,2-addition (in the case of butadiene—it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The term "vinyl" refers to the presence of a pendant vinyl group on the polymer chain. When referring to the use of butadiene as the conjugated diene, it is preferred that about 20 to about 80 mol percent of the condensed butadiene units in the copolymer block have 1,2 vinyl configuration as determined by proton NMR analysis. For selectively hydrogenated block copolymers, preferably about 30 to about 70 mol percent of the condensed,butadiene units should have 1,2 configuration. For unsaturated block copolymers, preferably about 20 to about 40 mol percent of the condensed butadiene units should have 1,2-vinyl configuration. This is effectively controlled by varying the relative amount of a distribution agent. The distribution agent employed during polymerization is typically a non-chelating ether such as diethyl ether or ortho-dimethoxy benzene. As will be appreciated, the distribution agent serves two purposes—it creates the controlled distribution of the mono alkenyl arene and conjugated diene, and also controls the microstructure of the conjugated diene. Suitable ratios of distribution agent to lithium are disclosed and taught in U.S. Pat. No. Re. 27,145, which disclosure is incorporated by reference.

Preparation of radial (branched) polymers requires a post-polymerization step called "coupling". In the above radial formula n is an integer of from 2 to about 30, preferably from about 2 to about 15, and X is the remnant or residue of a coupling agent. A variety of coupling agents are known in the art and include, for example, dihalo alkanes, silicon halides, siloxanes, alkoxy silanes, multi-functional epoxides, aliphatic epoxides, silica compounds, diesters of monohydric alcohols with carboxylic acids, and epoxidized oils. Star-shaped polymers are prepared with polyalkenyl coupling agents as disclosed in, for example, U.S. Pat. Nos. 3,985,830; 4,391,949; and 4,444,953; Canadian Patent Number 716,645. Suitable polyalkenyl coupling agents include divinyl arenes such as divinylbenzene, and preferably m-divinylbenzene. Preferred are tetra-alkoxysilanes such as tetra-ethoxysilane (TEOS), aliphatic diesters such as dialkyl adipates such as dimethyl adipate and diethyl adipate, and diglycidyl aromatic epoxy compounds such as diglycidyl ethers deriving from the reaction of bis-phenol A and epichlorohydrin.

Additional possible post-polymerization treatments that can be used to further modify the configuration of the polymers and therefore their properties include capping and chain-termination. Capping agents, such as ethylene oxide, carbon dioxide, or mixtures thereof serve to add functional groups to the chain ends, where they can then serve as reaction sites for further property-modifying reactions. In contrast, chain termination simply prevents further polymerization and thus prevents molecular weight growth beyond a desired point. Alternatively, the living copolymer may simply be hydrogenated to deactivate the metal sites.

It should be noted that, in yet another embodiment of the present invention, additional property improvements of the compositions hereof can be achieved by means of yet another post-polymerization treatment, that of hydrogenation of the block copolymer. The preferred hydrogenation is selective hydrogenation of the diene portions of the final block copolymer. Alternatively both the B blocks and the A blocks may be hydrogenated, or merely a portion of the B blocks may be hydrogenated. Hydrogenation generally improves thermal stability, ultraviolet light stability, oxidative stability, and, therefore, weatherability of the final polymer. A major advantage of the present invention is that the distribution agent, such as the non-chelating monoether, which is present during the initial polymerization process, does not interfere with or otherwise "poison" the hydrogenation catalyst, and thus the need for any additional removal steps is obviated.

Hydrogenation can be carried out via any of the several hydrogenation or selective hydrogenation processes known in the prior art. For example, such hydrogenation has been accomplished using methods such as those taught in, for example, U.S. Pat. Nos. 3,595,942; 3,634,549; 3,670,054; 3,700,633; and U.S. Pat. No. Re. 27,145, the disclosures of which are incorporated herein by reference.

Hydrogenation can be carried out under such conditions that at least about 80 percent of the conjugated diene double bonds have been reduced, and between zero and 10 percent of the arene double bonds have been reduced. Preferred ranges are at least about 95 percent of the conjugated diene double bonds reduced, and more preferably about 98 percent of the conjugated diene double bonds are reduced. Alternatively, it is possible to hydrogenate the polymer such that aromatic unsaturation is also reduced beyond the 10 percent level mentioned above. Such exhaustive hydrogenation is usually achieved at higher temperatures. In that case, the double bonds of both the conjugated diene and arene may be reduced by 90 percent or more.

In an alternative, the block copolymer of the present invention may be functionalized in a number of ways. One way is by treatment with an unsaturated monomer having one or more functional groups or their derivatives, such as carboxylic acid groups and their salts, anhydrides, esters, imide groups, amide groups, and acid chlorides. The preferred monomers to be grafted onto the block copolymers are maleic anhydride, maleic acid, fumaric acid, and their derivatives. A further description of functionalizing such block copolymers can be found in Gergen et al, U.S. Pat. No. 4,578,429 and in U.S. Pat. No. 5,506,299. In another manner, the selectively hydrogenated block copolymer of the present invention may be functionalized by grafting silicon or boron containing compounds to the polymer as taught in U.S. Pat. No. 4,882,384. In still another manner, the block copolymer of the present invention may be contacted with an alkoxy-silane compound to form silane-modified block copolymer. In yet another manner, the block copolymer of the present invention may be functionalized by grafting at least one ethylene oxide molecule to the polymer as taught in U.S. Pat. No. 4,898,914, or by reacting the polymer with carbon dioxide as taught in U.S. Pat. No. 4,970,265. Still further, the block copolymers of the present invention may be metallated as taught in U.S. Pat. Nos. 5,206,300 and 5,276,101, wherein the polymer is contacted with an alkali metal alkyl, such as a lithium alkyl. And still further, the block copolymers of the present invention may be functionalized by grafting sulfonic groups to the polymer as taught in U.S. Pat. No. 5,516,831. All of the patents mentioned in this paragraph are incorporated by reference into this application.

The bituminous component, also known as asphalt, present in the bituminous compositions according to the present invention may be a naturally occurring bitumen or derived from a mineral oil. Also petroleum pitches obtained by a cracking process and coal tar can be used as the bituminous component as well as blends of various bituminous materials. Examples of suitable components include distillation or "straight-run bitumens", precipitation bitumens, e.g. propane bitumens, blown bitumens, e.g. catalytically blown bitumen or "Multiphalt", and mixtures thereof. Other suitable bituminous components include mixtures of one or more of these bitumens with extenders (fluxes) such as petroleum extracts, e.g. aromatic extracts, distillates or residues, or with oils. Suitable bituminous components (either "straight-run bitumens" or "fluxed bitumens") are those having a penetration of in the range of from 50 to 300 dmm (deci-millimeters) at 25° C. In applications where the flexibility, tackiness or adhesion of the product is of high importance, fluxed bitumen having penetrations in the range of greater than 300 dmm at 25° C. are of particular use. Of use in the present invention are bitumens having ring and ball softening points of 110 to 150° F. The polymers of the present invention can be useful in the broad range from rigid bitumen to semi-liquid bitumen.

The polymer modifier is suitably present in the bituminous composition in an amount in the range of from 0.5 to 25% by weight. The lower ranges of polymer content are particularly interesting for applications, such as paving, which require a change of the bitumen character from viscous to visco-elastic. This change in properties generally occurs with polymer contents ranging from about 0.5% to about 8%. At higher polymer contents ranging to about 25% substantial increases in flexibility and elastic strength can be achieved. This is particularly interesting for roofing felt, adhesive and water-proofing membrane applications.

The bituminous composition may also, optionally, contain other ingredients such as may be required for the end-use envisaged. Thus fillers may be included, for example talc, aggregate, calcium carbonate and carbon black, or other components including resins, oils, stabilisers or flame retardants may be incorporated. The content of such fillers and other components may be in the range of from 0 to as much as 99% by weight. Of course, if advantageous, other polymer modifiers may also be included in the bituminous composition of the invention.

The useful low temperature and high temperature properties of the polymer-bitumen blends of the present invention coupled with the improved ageing resistance enables such blends to be of significant benefit in uses where the blends are exposed to external weather conditions, such as use in roofing applications, for example as a component of roofing felt. The usefully low high-temperature viscosity not only means that the polymer-bitumen blends can be more easily processed but also means that they enable a greater amount of filler to be incorporated before the maximum allowable processing viscosity is achieved, and thus leading to a cheaper product in those applications where fillers are commonly used.

The visco-elastic character inherent in the present invention enables application as hot mix paving cements. In hot mix paving cements the bituminous composition is mixed with large relative amounts of aggregate. Aggregate is generally composed of sand, rock and fines. The bituminous composition generally makes up 1 to 20 percent weight of the total hot mix paving cement.

The controlled distribution block copolymers of the present invention are particularly useful in asphaltic adhesive applications. Asphaltic adhesive applications comprise from 3 to 20 percent weight polymer, 5 to 50 percent weight filler (such as limestone, calcium carbonate, carbon black) and a light, low viscosity bitumen component. The asphaltic adhesives are useful in outdoor applications requiring resistance to moisture and generally have good flow and high tack with particularly good bonding to other bitumen based materials and to construction materials in general.

Mopping asphalt is one particularly useful application of the embodiment wherein the controlled distribution block copolymer is saturated by hydrogenation. Because the saturated controlled distribution block copolymers are particularly resistant to thermo-oxidative degradation they are more stable than unsaturated polymers in mopping asphalts which are heated to, maintained at, and applied at high temperatures. Mopping asphalts generally comprise 5 to 15 percent weight polymer and 85 to 95 percent weight bitumen. The polymer modification of mopping asphalt generally results in exceptional tack, stable softening point over a wide temperature range and exceptional bond strength, elastic recovery and tensile elongation.

Other applications in which the bituminous compositions of the present invention may be of use are sound deadening and vibration dampening applications, sealant or coating applications, and pipe coating and carpet backing.

EXAMPLES

The bitumen materials used for blends of these examples are characterized in Table 1. The polymers blended with bitumen in these examples are characterized in Table 2. Both the polymers of the invention and the comparative polymers listed in Table 1 are composed of styrene A blocks. In the case of the polymers of the invention, the B blocks are controlled distribution copolymer blocks composed of butadiene and styrene. In the case of the comparative polymers the B blocks are composed only of butadiene. None of the polymers of Table 1 were selectively hydrogenated.

Polymer-modified bitumen formulations demonstrating the present invention were made according to the following procedure. Blends of bitumen and polymer were made with a Silverson L4R high shear mixer. The bitumen was heated to between 150–180° C. and subsequently the polymer was added over a several minute period. Upon mixing, the temperature increased to between 170–200° C. which was caused by the mechanical energy input from the mixer. Blending at this temperature was continued until a homogeneous blend was obtained. The homogeneity of the blend was monitored by visual inspection of the consistency of the blend. Homogeneity was achieved after 45–90 minutes of mixing.

Formulations 1–12 having relatively low polymer content are shown in Table 3. Formulations 13–19 having relatively high polymer content are shown in Table 4.

Penetration of the neat bitumen and, polymer modified bitumen was measured according to ASTM D-5.

Ring and ball softening point of neat bitumen and polymer modified bitumen was measured according to ASTM D-36.

Static storage stability was measured according to ASTM D-5892.

TABLE 1

| Bitumen ID | Description, nominal | General compatibility | Relative viscosity | Pen. (dmm) | R & B softening point (° F.) |
|---|---|---|---|---|---|
| Bitumen I | AC-30 grade bitumen | Compatible | High | 46 | 138 |
| Bitumen II | AC-5 grade bitumen | Compatible | Low | 111 | 125 |
| Bitumen III | PG 64-22 grade bitumen | Moderately incompatible | High | 56 | 131 |

TABLE 2

| Polymer ID | Type | PSC (%) | MW A Block | MW B Block | % S in B Block | 1,2-butadiene | NMR blockiness | Calc. B blockiness | CE (%) |
|---|---|---|---|---|---|---|---|---|---|
| Polymer 29 | Radial | 66 | 21.4 | 115 | 54 | 19 | 66 | 42 | 82 |
| Polymer 30 | Radial | 49 | 21.2 | 113 | 30 | 19 | 74 | 41 | 81 |
| Comparative A | Radial | 30 | 21.0 | 98 | 0 | 8 | NA | NA | 84 |
| Polymer 16 | Linear | 42 | 15.5 | 116 | 28 | 23.5 | 56 | 12 | >90 |
| Polymer 17 | Linear | 63 | 15.6 | 100 | 50 | 24.6 | 45 | 11 | >90 |
| Polymer 18 | Linear | 40 | 11.7 | 101 | 25 | 22.8 | 59 | 22 | 70 |
| Comparative B | Linear | 31 | 16.1 | 72 | 0 | 8 | NA | NA | 84 |

NA = not applicable, midblock is composed entirely of butadiene monomer.
MW B block = the total molecular weight of the controlled distribution copolymer block.
% S in B Block = the percent weight of the B block composed of condensed styrene monomer.
CE = coupling efficiency
Calc. B blockiness = that portion of S in the controlled distribution block which has two or more adjacent S units.

TABLE 3

| Component | 1 | 2 | 3 | 4 | 5 | 6 | 7 | 8 | 9 | 10 | 11 | 12 |
|---|---|---|---|---|---|---|---|---|---|---|---|---|
| Polymer 29 | | | 3 | | 3 | | | | | | | |
| Polymer 30 | | | | 3 | | 3 | | | | | | |
| Polymer 16 | | | | | | | | | | 3 | | |
| Polymer 17 | | | | | | | | | | | 3 | |
| Polymer 18 | | | | | | | | | | | | 3 |
| Comparative A | | | | | | | 3 | 3 | | | | |
| Comparative B | | | | | | | | | 3 | | | |
| Bitumen I | 100 | | | | 97 | 97 | | 97 | 97 | 97 | 97 | 97 |
| Bitumen III | | 100 | 97 | 97 | | | 97 | | | | | |

The figures indicate the percent weight of the indicated component.

TABLE 4

| Component | 13 | 14 | 15 | 16 | 17 | 18 | 19 |
|---|---|---|---|---|---|---|---|
| Polymer 29 | | 12 | | | | | |
| Polymer 30 | | | 12 | | | | |
| Polymer 16 | | | | 12 | | | |
| Polymer 17 | | | | | 12 | | |
| Polymer 18 | | | | | | 12 | |
| Comparative A | 12 | | | | | | |
| Comparative B | | | | | | | 12 |
| Bitumen I | | | | | | | |
| Bitumen II | 88 | 88 | 88 | 88 | 88 | 88 | 88 |

The figures indicate the percent weight of the indicated component.

Example 1

The average penetration and ring and ball softening points were measured for formulations 14 through 19 and are shown in Tables 5 and 6, respectively. The formulations were aged in closed containers at 70° C. for the times indicated. Both the penetration and ring and ball softening point measurements were made on top and bottom sections of aged samples. The measurement reported in the tables represents the average of these measurements. All of these formulations were made with Bitumen II. The penetration of unmodified Bitumen II was 111 at 25° C. The ring and ball softening point of unmodified Bitumen II was 125° F. Improvements in penetration are evidenced by decreased penetration values. Improvements in ring and ball softening points are evidenced by increased values. The data of Tables 5 and 6 show that both the penetration and ring and ball softening points are improved over the unmodified bitumen by incorporation of the controlled distribution block copolymers.

TABLE 5

Penetration at 25° C. (dmm).

| Days of aging | 14 | 15 | 16 | 17 | 18 | 19 |
|---|---|---|---|---|---|---|
| 0 | 44 | 49 | 43 | 49 | 55 | 49 |
| 28 | 23 | 26 | 17 | 25 | 30 | 28 |
| 42 | 22 | 19 | 41 | 24 | 26 | 25 |
| 63 | 29 | 45 | 55 | 47 | 36 | 50 |

The data of Table 5 shows that the improvement in penetration is maintained over the 63 day heat aging period.

The data of Table 6 shows that the improvement in high temperature properties as evidenced by the ring and ball softening point is maintained over the 63 day heat aging period. The maintenance of improvement during heat aging is illustrative of the good compatibility of the polymer with the bitumen.

TABLE 6

R & B Softening Point (° F.).

Formulation

| Days of aging | 13 | 14 | 15 | 16 | 17 | 18 | 19 |
|---|---|---|---|---|---|---|---|
| 0 | 256 | 221 | 242 | 240 | 236 | 221 | 197 |
| 28 | 246 | 224 | 236 | 223 | 224 | 206 | 198 |
| 42 | 246 | 212 | 236 | 220 | 232 | 208 | 196 |
| 63 | 210 | 230 | 244 | 241 | 228 | 216 | 195 |

Example 2

The compatibility of the formulations were evaluated using the static storage stability procedure of ASTM D-5892. Formulations were aged in tubes at 163.5° C. for 48 hours. They were then chilled to −6.7° C. for 4 hours. The tubular samples were then cut into thirds and the ring and ball softening point of the top and bottom thirds was measured. During the heat aging portion of the experiment the polymer modified bitumen tends to separate into a polymer-rich top layer and a bitumen-rich bottom layer. The degree to which this happens depends upon compatibility of the polymer with the bitumen. When the polymer is very compatible with the bitumen the property difference between the top and bottom layers is small. The differences between the ring and ball softening point of the top and bottom layers are listed in Table 7.

TABLE 7

Ring and ball softening points after elevated heat aging.

| | | | Polymer content, | R & B soft. point, (° F.) | | |
|---|---|---|---|---|---|---|
| Formulation ID | Bitumen | Polymer | (%) | Top | Bottom | Difference |
| 7 | III | Comparative A | 3 | 208 | 139 | 69 |
| 4 | III | Polymer 30 | 3 | 153 | 140 | 13 |
| 3 | III | Polymer 29 | 3 | 143 | 135 | 8 |
| 8 | I | Comparative A | 3 | 208 | 143 | 66 |
| 6 | I | Polymer 30 | 3 | 158 | 142 | 17 |
| 5 | I | Polymer 29 | 3 | 145 | 138 | 7 |
| 9 | I | Comparative B | 3 | 190 | 143 | 48 |
| 10 | I | Polymer 16 | 3 | 193 | 144 | 50 |
| 12 | I | Polymer 18 | 3 | 172 | 146 | 27 |
| 11 | I | Polymer 17 | 3 | 162 | 145 | 17 |
| 16 | II | Comparative B | 12 | 236 | 169 | 68 |
| 17 | II | Polymer 16 | 12 | 228 | 216 | 12 |
| 19 | II | Polymer 18 | 12 | 196 | 188 | 8 |
| 18 | II | Polymer 17 | 12 | 200 | 168 | 33 |

The data of Table 7 show that a relatively large difference between top and bottom measurements exists for the formulations containing the comparative polymers. The comparative polymers do not have a controlled distribution midblock. There are no styrene monomer units dispersed in the rubber block of the comparative polymers. The improvement in compatibility according to the present invention is evidenced by smaller differences between top and bottom measurements with polymer having controlled distribution blocks.

Example 3 (Prophetic)

To prepare an asphaltic adhesive, 55 parts by weight of an AC-3 grade bitumen is heated to 150° C. Any one of the unhydrogenated polymers of the present invention listed in Table 2 is used. Alternately, a hydrogenated analog of the polymers in Table 2 can be used. A high shear Silverson L4R mixer is used to disperse 10 parts by weight of the polymer while it is added to the hot bitumen over a 5 minute period. Mixing is continued for 60 minutes and the temperature is maintained at 180° C. during the mixing. High shear mixing is discontinued. The bitumen-polymer mixture is maintained at 180° C. and 35 parts by weight of finely crushed limestone is added under low shear mixing conditions. Low shear mixing is continued until the limestone is uniformly dispersed. Once mixing is complete, the mixture is allowed to cool to room temperature.

The properties of the asphaltic adhesive are tested according to ASTM D 1970 and ASTM D 6135. Asphaltic adhesives of the present invention would have elongations greater than 10 percent, flexibility temperatures lower than −29° C., adhesion to plywood greater than 0.92 kfg per 30.5 cm of test specimen width at 4.4° C., and water vapor permeability of less than 5.7 ng/Pa.S.$M^2$.

Example 4 (Prophetic)

To prepare a mopping asphalt 92 parts by weight of an AC-10 grade bitumen is heated to 180° C. 8 parts by weight of a radial or linear, hydrogenated, controlled distribution block copolymer is added to the hot bitumen under high shear conditions using a Silverson L4R mixer. The polymer is added over a 5 minute period. The mixture is mixed and maintained at 200° C. for 60 minutes. Mixing is stopped and the mopping asphalt formulation is allowed to cool.

The properties of the mopping asphalt are tested according to ASTM D 6152. The mopping asphalts of the present invention will have softening points between 85 and 116° F., a softening point change of 5° F. or less after heat aging, a penetration between 20 and 60 dmm at 25° C. and a penetration decrease of no more than 5 units or a penetration increase of no more than 12 units after heat aging, a tensile elongation of 750 percent at 25° C. and an elastic recovery of 80 percent.

What is claimed:

1. A bituminous composition comprising:
   I) from about 75 percent to about 99.5 percent bitumen; and
   II) from about 0.5 percent to about 25 percent weight of a block copolymer having at least one A block and at least one B block wherein:
   a) each A block is a mono-alkenyl arene homopolymer block and each B block is a controlled distribution copolymer block of at least one conjugated diene and at least one mono-alkenyl arene;
   b) each A block having a number average molecular weight from about 3,000 and about 60,000 and each B block having a number average molecular weight from about 30,000 and about 300,000;
   c) each B block comprises terminal regions adjacent to the A blocks that are rich in conjugated diene units and one or more regions not adjacent to the A blocks that are rich in mono-alkenyl arene units;
   d) the total amount of mono-alkenyl arene in the block copolymer is about 20 percent weight to about 80 percent weight; and
   e) the weight percent of mono-alkenyl arene in each B block is from about 10 percent to about 75 percent.

2. The bituminous composition of claim 1 wherein said mono-alkenyl arene is styrene and said conjugated diene is selected from the group consisting of isoprene and butadiene.

3. The bituminous composition of claim 1 wherein said conjugated diene is butadiene, and wherein about 20 to about 80 mol percent of the condensed butadiene units in the block B have 1,2-configuration.

4. The bituminous composition of claim 1 wherein said conjugated diene is butadiene, and wherein about 20 to about 40 mol percent of the condensed butadiene units in the B block have 1,2-configuration.

5. The bituminous composition of claim 1 wherein the styrene blockiness index of the block B is less than 42 percent.

6. The bituminous composition of claim 1 wherein the styrene blockiness index of the block B is less than 22 percent.

7. The bituminous composition of claim 3 wherein the weight percentage of styrene in the B block is between about 10 weight percent and about 50 weight percent, and the styrene blockiness index of the block B is less than 22 percent, said styrene blockiness index being the proportion of styrene units in the B block having two styrene neighbors on the polymer chain.

8. The bituminous composition of claim 1 wherein the block copolymer has the general configuration (A—B)$_n$X or (A—B—A)$_n$X and mixtures thereof where X is the residue of a coupling agent and n is an integer from 2 to about 30.

9. The bituminous composition of claim 8 wherein the coupling agent residue derives from coupling agents selected from the group consisting of divinyl arenes, silicon halides, alkoxy silanes, aliphatic epoxies, glycidyl aromatic epoxies, and diesters.

10. The bituminous composition of claim 9 wherein the coupling agent is tetra-ethoxy silane.

11. The bituminous composition of claim 9 wherein the coupling agent is dialkyl adipate.

12. The bituminous composition of claim 9 wherein the coupling agent is a glycidyl aromatic epoxy formed by the reaction of bisphenol A and epichlorohydrin.

13. The bituminous composition of claim 9 wherein the coupling agent is m-divinyl-benzene.

14. The bituminous composition of claim 1 wherein the block copolymer comprises at least 70 percent A—B—A configuration.

15. The bituminous composition of claim 1 wherein the block copolymer comprises at least 70 percent radial copolymer.

16. The bituminous composition of claim 1 wherein the block copolymer is from about 0.5 percent to about 8 percent weight.

17. The bituminous composition of claim 1 wherein the block copolymer is from 8 percent to about 25 percent weight.

18. The bituminous composition of claim 1 wherein the bitumen has a penetration from 50 to 300 dmm at 25° C.

19. The bituminous composition of claim 1 wherein the bitumen has a ring and ball softening point from about 110 to about 150° F.

20. A paving formulation comprising aggregate and from 1 to 20 percent weight of the bituminous composition of claim 1.

21. An adhesive comprising from 3 to 20 percent weight of the bituminous composition of claim 1 and from 5 to 50 percent weight filler.

22. A bituminous composition comprising:
    I) from about 75 percent to about 99.5 percent bitumen; and
    II) from about 0.5 percent to about 25 percent weight of an unhydrogenated block copolymer having at least one A block and at least one B block wherein:
    a) each A block is a mono-alkenyl arene homopolymer block and each B block is a controlled distribution copolymer block of at least one conjugated diene and at least one mono-alkenyl arene;
    b) each A block having a number average molecular weight from about 3,000 and about 60,000 and each B block having a number average molecular weight from about 30,000 and about 300,000;
    c) each B block comprises terminal regions adjacent to the A blocks that are rich in conjugated diene units and one or more regions not adjacent to the A blocks that are rich in mono-alkenyl arene units;
    d) the total amount of mono-alkenyl arene in the block copolymer is about 20 percent weight to about 80 percent weight; and
    e) the weight percent of mono-alkenyl arene in each B block is from about 10 percent to about 75 percent.

23. A bituminous composition comprising:
    I) from about 75 percent to about 99.5 percent bitumen; and
    II) from about 0.5 percent to about 25 percent weight of a hydrogenated block copolymer having at least one A block and at least one B block wherein:
    a) each A block is a mono-alkenyl arene homopolymer block and each B block is a controlled distribution copolymer block of at least one conjugated diene and at least one mono-alkenyl arene;
    b) each A block having a number average molecular weight from about 3,000 and about 60,000 and each B block having a number average molecular weight from about 30,000 and about 300,000;
    c) each B block comprises terminal regions adjacent to the A blocks that are rich in conjugated diene units and one or more regions not adjacent to the A blocks that are rich in mono-alkenyl arene units;
    d) the total amount of mono-alkenyl arene in the block copolymer is about 20 percent weight to about 80 percent weight; and e) the weight percent of mono-alkenyl arene in each B block is from about 10 percent to about 75 percent.

24. The bituminous composition of claim 23 wherein the block copolymer has the general configuration $(A—B)_n X$ or $(A—B—A)_n X$ and mixtures thereof where X is the residue of a coupling agent and n is an integer from 2 to about 30.

25. The bituminous composition of claim 23 wherein the conjugated diene is selectively hydrogenated to saturate at least 80% of the double bonds.

26. The bituminous composition of claim 23 wherein the said mono-alkenyl arene is styrene and said conjugated diene is selected from the group consisting of isoprene and butadiene.

27. The bituminous composition of claim 23 wherein said conjugated diene is butadiene, and wherein about 20 to about 80 mol percent of the condensed butadiene units in the block B have 1,2-configuration.

28. The bituminous composition of claim 23 wherein the styrene blockiness index of the block B is less than about 42 percent.

29. A mopping asphalt comprising the bituminous composition of claim 23 wherein the bituminous composition comprises from 5 to 15 percent weight of the hydrogenated block copolymer.

* * * * *